United States Patent
Huisman et al.

(10) Patent No.: US 10,442,121 B2
(45) Date of Patent: Oct. 15, 2019

(54) METHOD AND APPARATUS FOR MANUFACTURING SUSTAINABLE PRODUCTS WITH A BLOWN, FOAM STRUCTURE

(71) Applicant: PaperFoam B.V., Barneveld (NL)

(72) Inventors: Jan Wietze Huisman, Barneveld (NL); Nynke Margaretha Zandstra, Barneveld (NL); Johan Hendrik Adolf Arentsen, Barneveld (NL); Hugo Mark Geerts, Barneveld (NL)

(73) Assignee: Paperfoam B.V., Barneveld (NL)

( * ) Notice: Subject to any disclaimer, the term of this patent is extended or adjusted under 35 U.S.C. 154(b) by 651 days.

(21) Appl. No.: 14/383,184

(22) PCT Filed: Mar. 11, 2013

(86) PCT No.: PCT/NL2013/050159
§ 371 (c)(1),
(2) Date: Sep. 5, 2014

(87) PCT Pub. No.: WO2013/137722
PCT Pub. Date: Sep. 19, 2013

(65) Prior Publication Data
US 2015/0054190 A1 Feb. 26, 2015

(30) Foreign Application Priority Data

Mar. 12, 2012 (NL) ...................... 2008466

(51) Int. Cl.
*B29C 44/34* (2006.01)
*C08L 3/02* (2006.01)
(Continued)

(52) U.S. Cl.
CPC ............ *B29C 44/348* (2013.01); *B29C 44/08* (2013.01); *B29C 44/3403* (2013.01);
(Continued)

(58) Field of Classification Search
CPC . B29C 44/38; B29C 44/3446; B29C 44/3449; B29C 44/462
(Continued)

(56) References Cited

U.S. PATENT DOCUMENTS 3,770,663 A * 11/1973 Ueki .................... C08J 9/18
521/134
4,464,484 A * 8/1984 Yoshimura .......... B29C 44/3461
264/50
(Continued)

FOREIGN PATENT DOCUMENTS

EP 0053333 A1 * 6/1982 ............ C08J 9/0061
EP 1847562 A1 10/2007
(Continued)

*Primary Examiner* — Atul P. Khare
(74) *Attorney, Agent, or Firm* — Hoffmann & Baron, LLP

(57) ABSTRACT

A method for manufacturing sustainable products with a blown, foam structure, wherein a mass comprising at least natural polymers such as starch is passed under pressure into a mold cavity (4) or through a mold die, and the mass is heated in the mold in a manner such as to stabilize the foamed structure to form the product, wherein the method comprises prefoaming of the mass prior to injection in the mold. Preferably, the prefoamed mass is kept under pressure until insertion in the mold. The invention further relates to an apparatus to be used in said method.

22 Claims, 2 Drawing Sheets

(51) Int. Cl.
*B29C 44/08* (2006.01)
*B29C 45/17* (2006.01)
*B29C 44/46* (2006.01)
*B29L 31/00* (2006.01)

(52) U.S. Cl.
CPC ...... *B29C 44/3415* (2013.01); *B29C 44/3442* (2013.01); *B29C 44/3496* (2013.01); *B29C 45/1701* (2013.01); *C08L 3/02* (2013.01); *B29C 44/462* (2013.01); *B29K 2003/00* (2013.01); *B29L 2031/772* (2013.01)

(58) Field of Classification Search
USPC .................................................. 264/50, 51
See application file for complete search history.

(56) References Cited

U.S. PATENT DOCUMENTS

| | | | | |
|---|---|---|---|---|
| 4,567,208 A | * | 1/1986 | Kuwabara | C08J 9/18 264/50 |
| 4,804,507 A | * | 2/1989 | Rubens | B29C 44/3461 264/50 |
| 4,818,451 A | * | 4/1989 | Arai | B29C 44/34 264/40.3 |
| 5,618,478 A | * | 4/1997 | Wirobski | C08J 9/228 264/50 |
| 6,251,318 B1 | * | 6/2001 | Arentsen | B29C 44/0407 264/45.5 |
| 6,326,409 B1 | * | 12/2001 | Mihayashi | C08J 9/0061 521/134 |
| 6,521,147 B1 | | 2/2003 | Arentsen et al. | |
| 6,596,389 B1 | * | 7/2003 | Hallett | C04B 26/02 181/284 |
| 6,641,758 B1 | * | 11/2003 | Arentsen | C08J 9/125 264/328.1 |
| 7,358,280 B2 | * | 4/2008 | Berghmans | B29C 44/3453 521/146 |
| 7,850,883 B2 | * | 12/2010 | Huisman | B29C 44/588 264/41 |
| 8,569,390 B2 | * | 10/2013 | Kiguchi | B29C 44/445 521/56 |
| 8,778,438 B2 | * | 7/2014 | Leser | A21D 2/16 426/564 |
| 8,921,434 B2 | * | 12/2014 | Uchiyama | B29C 47/0004 264/53 |
| 2005/0059747 A1 | | 3/2005 | Berghmans et al. | |
| 2008/0153933 A1 | * | 6/2008 | Kiguchi | B29C 44/445 521/56 |
| 2010/0310746 A1 | * | 12/2010 | Leser | A21D 2/16 426/541 |

FOREIGN PATENT DOCUMENTS

WO  9630186  10/1996
WO  2005019310 A2  3/2005

* cited by examiner

METHOD AND APPARATUS FOR MANUFACTURING SUSTAINABLE PRODUCTS WITH A BLOWN, FOAM STRUCTURE

This application is the U.S. National Phase of, and Applicant claims priority from, International Patent Application Number PCT/NL2013/050159 filed 11 Mar. 2013, which claims priority from NL 2008466 filed 12 Mar. 2012, each of which is incorporated herein by reference.

FIELD OF THE INVENTION

The present invention relates to a method for manufacturing sustainable products with a blown, foam structure and to an apparatus which can be used therefore. More in particular, the invention relates to manufacturing of sustainable products with a blown, foam structure from a liquid mass comprising natural polymers such as starch.

BACKGROUND

It is known to use products with a blown, foam structure when a product with a certain volume and a minimum weight is desired, for instance for packaging purposes such as in packages configured for receiving and holding fragile, breakable products. Such packages may be manufactured from a foamed plastic such as expanded polystyrene or expanded polypropylene. A drawback of using such material as packaging material is that it is not particularly environmental friendly because the difficulty to recycle or dispose it and because such material is made from non-renewable resources.

A more environmental friendly alternative is provided by means of manufacturing such products from a bio-polymer material from renewable resources, such as a starch based material. Such a method is for instance known from WO 96/30186 and from U.S. Pat. No. 6,521,147. The known method comprises supplying a starch based starting material comprising water as blowing agent under pressure into or through a mould and heating said mass in the mould in a manner such as to give rise to gelatinization and cross-linking of the natural polymers. Prior to the introduction in the mould, the mass has a temperature which is at or below the gelatinization temperature and in the mould the mass is maintained at least for some time at a temperature which is above the baking temperature. In this method, the mould cavity is filled with the mass for approximately 50%. Due to the stabilization inside the mould cavity and the heat activation of the blowing agent, the mass is going to create foam, the foam creates additional volume and force to flow further into the cavity, and in this way, the complete cavity is filled. The mass may be a liquid batter comprising a suspension or solution of at least natural polymers such as starch in a liquid. By using such a batter, which is liquid below the gelatinization temperature, supply of the batter can be realized in a simple manner, for instance via pipes and using simple pumping means. The liquidity of the batter provides the advantage that the flow path in the mould is particularly long. The water in the batter functions as blowing agent and moreover, upon evaporating from the mould, provides space for the expansion of the cells of the polymers. Alternatively, the mass may be in a dry condition when introducing it into the mould. The mass may for instance be a mass in a granulate form and comprise more or less spherical particles having small to very small dimensions with respect to the passage openings to and in the mould. This granulate material can contain a blowing agent, for instance in the form of water or blowing agents simply released and/or evaporating upon heating such as bicarbonates which provide for gas evolution through decomposition at elevated temperature. The granulate particles may be slightly prefoamed prior to introduction in the mould without this giving rise to gelatinization. Gelatinization is intended to refer to a change of a natural polymer form a slightly or completely loose granular or comparable granulate form into a dry or non-dry and/or foamed cohesive form, in which stretched polymers are present which are mutually bonded to a limited extent only, if at all. The use of relatively dry, optionally slightly pre-foamed starting material provides the advantage that relatively little water or other moisture needs to evaporate in the mould. The granulate-form mass may be used to form a product by means of for instance extrusion on an extrusion apparatus. Such apparatus therefore may comprise an extrusion die and supply means for feeding a mass under pressure through said die. The apparatus further comprises heating means for heating the die and means for keeping the supply means relatively cool with respect to the die to keep the mass inside the supply means at least below the gelatinization temperature. The mass in granulate form, whether or not in a slightly pre-foamed condition is fed from a supply device of the apparatus via the spray nozzle to the heated extrusion die and forced through the or each extrusion orifice. The granulate particles can contain for instance, water or a different blowing agent in a relatively small amount. The particles are heated after being introduced into the die and will swell as a result since the blowing agent present will blow up the particles, just as in the case of the particles included in a liquid batter The leading part of the mass gelatinizes and proceeds to cross-link, whereby the moisture evaporates from the mass and provides for the foaming of the product.

During insertion of the mass in a mould cavity according to WO 96/30186, formation of a skin, i.e. at the contact surface of the mass and the mould cavity, is started immediately. Consequently, at different locations of the product outer surface, depending on the flow of the mass inside the mould cavity, the skin is formed at different moments. This may lead to different surface structures at the outer surface of the product, for instance areas with a smooth surface and areas with a more structured surface. Especially, when manufacturing products having a relatively dark colour this may lead to products with a marbled outer surface, which may be aesthetically undesired for instance dependent on the specific function of the product. Besides, due to fact that the actual foaming of the mass takes place inside the mould cavity, correct dosing of the mass that is inserted in the mould cavity may be difficult. Furthermore movement inside the mould cavity of initially formed and dried skin may result in obstruction of one or more deaeration channels present in the mould. Also the foaming process inside the mould cavity may be difficult to control.

Thus, it is an object of the present invention to provide an improved method for manufacturing products with a blown, foam structure based upon renewable biopolymers. More in particular an object to the invention is to provide a method for manufacturing products with a blown, foam structure, in which the skin formation and the internal structure of the foam on different locations in the mould cavity may be more evenly distributed and in which the mass insertion process may be easier to control.

SUMMARY OF THE INVENTION

Therefore, the invention provides a method for manufacturing sustainable products with a blown, foam structure, wherein a mass comprising at least natural polymers such as starch is passed under pressure into a mould cavity or through a mould die, and the mass is heated in the mould to dry the mass to form the product, wherein the method comprises prefoaming of the mass prior to injection in the mould. Due to the prefoaming of the mass, the mould cavity may be filled completely in a simple and instantaneous manner. The prefoamed mass may be easily introduced in the mould cavity until the mould cavity is substantially entirely filled. Thus also mould cavities with complex shapes and configured for moulding of products with thin walls may be filled easily and quickly. Consequently, the skin on the prefoamed mass, which mass abuts with the mould cavity surface, may be formed in a substantially even manner thereby preventing, or at least minimizing occurrence of marbling and shininess. This may be particularly advantageous in case the aesthetics of the products that are manufactured by the method according to the invention are of importance. Inside the mould cavity, the introduced prefoamed mass may expand a little further while stabilizing the foamed structure to form the product. This expansion and foaming is caused by heat-activation of the blowing agent: the evaporated blowing agent will build up pressure and thus foaming occurs. The pressure finally will result in opening of the cells and then vapour will be allowed to escape very easily. Due to the prefoaming and pressurization of the prefoamed mass until insertion in the mould cavity, the foamed product may comprise a substantially homogeneous density and therefore internal foam structure, especially when compared to the method according to WO 96/30186. In the homogeneous internal foam structure the distribution of the respective cells, at least with respect to cell size and amount of cells compared to material surrounding said cells, from one outer surface of the product to the opposing outer surface of the product (seen in a cross sectional view) is substantially homogeneous. Furthermore, since the prefoamed mass only needs to expand a little more inside the mould cavity, since the foam will have an open cell structure very rapidly, and since vapour can escape through the open cells easily, the process cycle time may be decreased, resulting in lower manufacturing costs. Another advantage of the method according to the invention lies in the fact that due to the prefoaming step, the mass does not need to contain as much water to act as a blowing agent as in the above mentioned known method. This may lead to relatively quick evaporation of the blowing agent resulting in shorter manufacturing process cycles and therefore also to less manufacturing costs.

During prefoaming of the mass, a relatively large amount of gas may actively inserted into the mass to entrap gas bubbles inside the mass while at the same time a pressure is applied to the mass. Since the mass is kept under pressure, the gas bubbles will be very small. In the mould cavity, the pressure is lower than the pressure applied to the prefoamed mass before insertion in said cavity. Preferably, the pressure inside the mould cavity is atmospheric pressure. Upon insertion of the prefoamed mass in the mould cavity, the pressure applied to the prefoamed mass decreases instantly such that the gas bubbles will expand immediately resulting in a foamed mass inside the mould cavity. Since the expansion of the prefoamed mass inside the cavity is mainly obtained due to entrapped gas bubbles in combination with a decreased pressure applied to said prefoamed mass, the mass itself may have little foaming capability. This enables the use of, at least compared to the method of WO 96/30186, a mass comprising less natural polymers and/or low foaming starch, such as corn starch or wheat starch or other materials such as clay or chalk that are cost efficient or bio plastics that may enhance the strength of the manufactured. Besides, cross linkers may be used to advantage in the method according to the invention to enhance the moisture resistance of the manufactured product.

Preferably, in further elaboration of the invention, the prefoamed mass is kept under pressure until insertion in the mould. Preferably, a pressure inside the mould cavity is lower than the pressure applied to the prefoamed mass before insertion thereof into the mould cavity.

In further elaboration of the invention, the prefoaming of the mass comprises introducing a gas, such as air, oxygen, nitrogen or carbon dioxide, in a liquid mass comprising at least said natural polymers to form a prefoamed mass having a lower density than the liquid mass prior to prefoaming. By doing so, the density of the material decreases. By pressurizing the prefoamed mass, the mass will retain a relatively high density during further processing thereof. Due to the pressurization, the gas bubbles inside the prefoamed material are relatively small which prevents escaping of the gas or fusing of adjacent gas bubbles, resulting in a relatively stable foam. Further process steps, for instance adding additives, for foam stability are minimized or are not necessary at all. The liquid mass, before prefoaming, may be formed out of a suspension being a batter or starch batter comprising a least the natural polymers and of a foaming agent. Using carbon dioxide for prefoaming the mass has the advantage that said gas dissolves better in liquid. Consequently, the carbon dioxide bubbles inside the prefoamed mass will be smaller than when using for instance oxygen or nitrogen. Thus, the stability of the prefoamed mass will increase, at least with respect to using other kinds of gas such as oxygen or nitrogen. After introduction of the prefoamed mass comprising carbon dioxide bubbles into the mould cavity, the carbon dioxide will escape from the mass relatively quickly, at least compared to using oxygen or nitrogen.

In a further elaboration of the invention, a ratio of the volume of the mass before the prefoaming with respect to the volume of the performed mass is approximately between 1:1.6 and 1:1.2. The ratio may for example be between 1:1.5 and 1:1.3, for instance approximately 1:1.43. This enables compact intermediate storage of the prefoamed mass. Also the supply system for supplying the prefoamed mass to the mold may be compact and supplying of the prefoamed mass leaving the prefoaming means to multiple injection molding stations may be possible. By controlling the pressure of the prefoamed mass volumetric dosing will be possible, as well as optional dosing during a specific time.

According to a further aspect of the invention, the prefoamed mass is kept under pressure during prefoaming. Preferably, said pressure is approximately between $3 \times 10^5$ $N/m^2$ (3 bar) and $6 \times 10^5$ $N/m^2$ (6 bar), for instance approximately $5 \times 10^5$ $N/m^2$ (5 bar). Preferably, according to a further aspect of the invention, the density of the prefoamed mass is approximately 200-400 grams/liter, for instance 300-400 grams/liter, measured at atmospheric pressure ($1.01 \times 10^5$ $N/m^2$ (1.01 bar). After leaving the prefoaming means, for instance leaving a receptacle wherein the prefoamed mass is kept, the pressure applied to the prefoamed mass may be increased gradually.

According to a further advantageous embodiment of the invention, the prefoamed mass is kept under pressure after prefoaming and during supplying it to the mould. For instance, the pressure may be approximately between $3 \times 10^5$ $N/m^2$ (3 bar) and $6 \times 10^5$ $N/m^2$ (6 bar), for instance approximately $5 \times 10^5$ $N/m^2$ (5 bar), for instance applied in the conduit between the prefoaming means and the supply means to supply the prefoamed mass into the mould cavity. This may result in a density of approximately 700-800 grams/liter of the mass while located in said conduit. In an alternative embodiment of the method according to the invention, the prefoaming process step and the moulding process step can be separated. In that case, the prefoamed mass can be stored, for instance in containers, and be supplied to the moulding station when desired. Thus, after prefoaming, the prefoamed mass is stored batch wise in the containers, and is also preferably kept under a pressure of approximately between $3 \times 10^5$ N/m$^2$ (3 bar) and $6 \times 10^5$ N/m$^2$ (6 bar), for instance approximately $5 \times 10^5$ N/m$^2$ (5 bar). During supply of the prefoamed mass into the mould cavity, the pressure applied to the prefoamed mass may be approximately between $2 \times 10^5$ N/m$^2$ (2 bar) and $4 \times 10^5$ N/m$^2$ (4 bar), for instance approximately $3 \times 10^5$ N/m$^2$ (3 bar). With such pressurized prefoamed mass in the manufacturing method according to the invention, supplying of said mass over relatively large distances, for instance from the prefoaming means to at least one or more moulds is possible.

With the method according to the invention, the mould may be of a simpler construction, for instance compared to the method of WO 96/30186, since no deaeration channels around the mould cavity are necessary and the formed products need minimal or no finishing.

Due to the relatively quick expansion of the prefoamed mass during introducing said mass in the mould cavity, according to another aspect of the invention this method is used with a substantially closed mould. The pressure inside the closed mould is lower then the pressure applied to the prefoamed mass during supply of the prefoamed mass into the mould. Thus, upon introduction of the prefoamed mass inside the mould cavity, the mass will expand quickly such that the mass will fill the entire cavity immediately. Consequently, the density of the mass will decrease after insertion of the mass into the mould cavity. Therefore, according to a further aspect of the invention the mould used in the method according to the invention is an injection mould.

According to a further aspect of the invention, the mould is heated to approximately the baking temperature prior to introduction of the prefoamed mass into the mould, wherein the temperature of the mould is preferably brought to approximately 180-225° C. Due to the heat in the mould, blowing agent will immediately start to evaporate and build up pressure, at the same time stabilization of the prefoamed mass will occur. Inside the foam the pressure will drop as soon the foam structure breaks into open cells. Now remaining vapour will be allowed to escape rapidly. Preferably, the pressure inside the mould cavity may be controlled during the actual moulding of the product in order to control the expansion or compression of the prefoamed material inside the mould cavity.

In further elaboration of the invention, the mass is formed by a liquid batter comprising a suspension or solution of at least the natural polymers such as starch in a liquid. Preferably, a batter may be used which consists substantially entirely of natural constituents. In a further elaboration of the invention, a blowing agent, preferably at least water, is included in the mass. Preferably, the mass contains at least 10% of weight of water.

To enhance the product stability, strength, flexibility or any combination thereof, of the products manufactured with a method according to the invention, the mass may comprise fibres, approximately at least 0.5%, for instance between 2-25% and preferably between 4-15%.

In further elaboration of the invention, the method further comprises inserting additives to the mass during or after prefoaming of said mass. Such additives may for instance comprise reactive materials, cross-linkers, stabilizers, foaming agents, colouring agents or the like additives. Instead or additionally, basic components of the starting material of the mass may be added during or after prefoaming. This may be advantageous in case the basic components are perishable or in case said components may influence the pumpability of the mass or the construction of the mixing system for creating the prefoamed mass.

The invention also relates to an apparatus for manufacturing sustainable products with a blown, foam structure comprising a mould which contains at least one mould cavity or a mould die and supply means for feeding a mass under pressure into the or each mould cavity or through the mould die, wherein the apparatus comprises heating means for heating the mould and prefoaming means provided upstream the supply means for prefoaming the mass. The apparatus may further be configured to keep the prefoamed mass under pressure. The apparatus for manufacturing sustainable products with a blown, foam structure may be used in a method for manufacturing said products as above described. Such apparatus provides similar advantages and effects as the above described method.

The heating means for heating the mould enable the prefoamed mass that is inserted under pressure in the mould cavity to expand further and completely fill the mould cavity. By means of the heat, water included in the mass will evaporate such that the mass expands further and is able to completely fill the cavity. Pressure will increase to maximum until opening of the cells. Vapour will escape and the product has to stabilize until it is ready to be ejected from the mould.

To keep the prefoamed mass stable until use thereof, the prefoaming means preferably comprises a pressure regulator for bringing and/or keeping the prefoamed mass under a pressure of approximately between $3 \times 10^5$ N/m$^2$ (3 bar) and $6 \times 10^5$ N/m$^2$ (6 bar), for instance approximately $5 \times 10^5$ N/m$^2$ (5 bar). To be able to keep the prefoamed mass under such substantially constant pressure, until insertion of said prefoamed mass into the mould cavity, the apparatus may be provided with a pressure conduit extending between the prefoaming means and the supply means having a pressure control. In further elaboration of the invention, the supply means comprise a pressure control to bring and/or keep the pressure during insertion of the mass into the mould cavity substantially constant, for instance at substantially $3 \times 10^5$ N/m$^2$ (3 bar). According to a further aspect of the invention, and enabled by keeping the pressure of the mass substantially constant during insertion, the apparatus is configured to control insertion of the amount of prefoamed mass into the mould cavity based on volume and/or time. In different words, the amount of prefoamed mass that is inserted in the mould cavity may be determined by controlling the volume of the prefoamed mass during insertion in the cavity or by controlling the insertion time of the prefoamed mass during insertion thereof in the cavity.

The aforementioned and other features and advantages of the invention will be more fully understood from the following detailed description of certain embodiments of the invention, taken together with the accompanying drawings, which are meant to illustrate and not to limit the invention.

DETAILED DESCRIPTION

Figure 1:
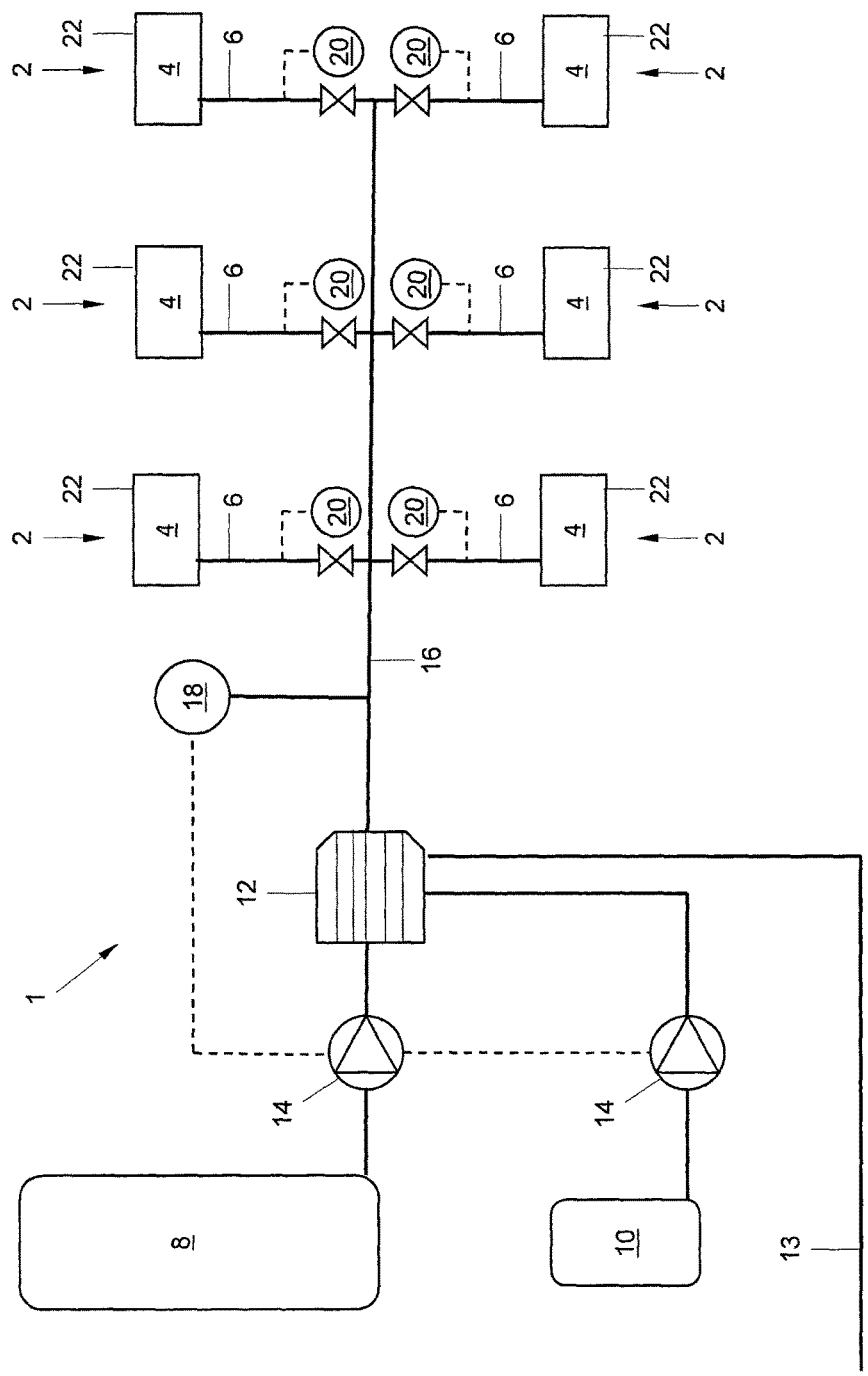
FIG. 1 shows a schematic overview of an apparatus for manufacturing sustainable products with a blown, foam structure according to an embodiment of the invention.

In FIG. 1 a schematic overview of an apparatus 1 for manufacturing sustainable products according to an embodiment of the invention is shown. The apparatus 1 may be used for a method for manufacturing sustainable products according to the invention. With the shown apparatus 1 different kind of products, for instance packages, may be manufactured. The apparatus 1 comprises different injection moulding stations 2. Each injection moulding station 2 comprises an injection mould 4 having a mould cavity configured to manufacture a product having a predetermined shape. Each moulding station 2 further comprises a prefoamed mass supply 6 for feeding prefoamed mass to the mould cavity of the injection mould. The prefoamed mass is formed out of a suspension, i.e. the batter, at least comprising natural polymers such as starch in a liquid such as water and of a foaming agent. The apparatus 1 comprises a suspension vessel 8 that holds the batter and a foaming agent vessel 10 that holds the foaming agent. The foaming agent vessel 10 may also hold a reactive component, a colouring agent and/or a stabilizer. However, in a different embodiment, these components may instead be received in a further vessel and be supplied separately to the prefoaming means 12 by means of a further pump. In a further different embodiment, the apparatus only comprises a suspension vessel 8. The batter may comprise additional ingredients, for instance fibres, for instance at least 0.5%, between 2-25% and preferably between 4-15%. The apparatus 1 comprises a prefoaming means 12 for prefoaming the prefoamed mass. Therefore, the apparatus 1 further comprises a gas supply 13 for supplying gas such as oxygen, nitrogen or carbon dioxide to the prefoaming means 12.

Between the vessels 8, 10 and the prefoaming means 12, pressure regulators 14 are provided for supplying the respective batter, gas and the foaming agent to the prefoaming means 12. The pressure inside the prefoaming means 12, during the prefoaming process may be kept at approximately $5 \times 10^5$ N/m² (5 bar) to create a substantially stable prefoamed mass. In the conduit 16 that extends between the prefoaming means 12 and the respective injection mould stations 4 a further pressure regulator 18 is provided for keeping the prefoamed mass under said substantially constant pressure of approximately $5 \times 10^5$ N/m² (5 bar). Due to the pressurized condition of the prefoamed mass, the mass may be stored easily without quality loss of the mass and may be transported easily to further processing stations in the apparatus 1. In each prefoamed mass supply 6 a pressure regulator 20 is provided for pressure control of the prefoamed mass that is to be inserted in the respective mould cavities of the injection moulds 4. Preferably, the prefoamed mass is kept under a pressure of approximately $3 \times 10^5$ N/m² (3 bar) during insertion in the mould cavity. The injection moulds 4 preferably comprise heating means 22 for heating the prefoamed mass when introduced in the respective cavities to enable further expansion, foaming and baking of the product. In the described apparatus 1, multiple injection moulding stations 2 are provided. However, in a different embodiment of the apparatus according to the invention (not shown) a different number of injection moulding stations 2 may be provided. Furthermore, the moulds 4 of the different moulding stations 2 may have one of more moulding cavities depending on the design of the product to be manufactured. The apparatus 1 may also comprise inserting devices (not shown) for inserting additives to the prefoamed mass, for instance during prefoaming, after prefoaming or just before inserting the prefoamed mass into the mould cavity.

The apparatus 1 according to the invention can be used to manufacture a sustainable product with a blown, foam structure with the method according to the invention. The method according to the invention will now be explained in detail, referring to the different apparatus parts shown in FIG. 1 when necessary.

The moulds 4 are prepared by clamping the respective mould parts against each other to form the mould cavity and the prefoamed mass supplies 6 are connected to the respective supply openings of the moulds 4 to be able to insert the prefoamed mass into the mould cavities. The prefoamed mass is formed out of a batter comprised in the suspension vessel 8, gas and of the foaming agent provided in the foaming agent vessel 10. In a different embodiment, it is possible that no additional foaming agent is used. The batter may have a density of approximately 1000 grams/liter. By means of pumping means, all ingredients are supplied to the prefoaming means 12 thereby forming a liquid mass. In the prefoaming means 12, gas such as air, oxygen, nitrogen or carbon dioxide is introduced in the liquid mass resulting in a prefoamed mass comprising small gas bubbles. The prefoamed mass is formed under a substantially constant pressure, for instance of approximately $5 \times 10^5$ N/m² (5 bar) so as to ensure that the gas bubbles remain small enough to avoid the prefoamed mass from becoming unstable. The prefoamed mass may have a density of approximately 200-400 grams/liter, for instance 300-400 grams/liter, measured at atmospheric pressure. When supplying the prefoamed mass from the prefoaming means 12 to the respective injection moulding stations 2, the prefoamed mass remains pressurized in the pressure conduit 16 extending from the prefoaming means 14 and the respective supply lines 6, for instance with a pressure of approximately $5 \times 10^5$ N/m² (5 bar). With this increased pressure, the density of the prefoamed mass may be approximately 700-800 grams/liter. Pressurization of the prefoamed mass inside the conduit 16 is controlled by means of the pressure regulator 18.

Because of the stability of the prefoamed mass and the relatively high density of said mass, the prefoamed mass can be stored and transported without risking disintegration of the prefoamed mass. Consequently, the pressurized prefoamed mass can be transported along relatively large distances. This enables supplying of said mass from a single prefoaming means 12 to different injection moulding stations 2.

It is possible to add additives to the prefoamed mass during forming of said mass in the prefoaming means 12. Such additives may for instance comprise a cross-linker to provide the end product with water and/or moisture resistant properties. Also colouring agents or other additives may be introduced in the prefoamed mass. Additionally or instead, additives may be added to the prefoamed mass just before insertion of the prefoamed mass into the cavity. Before insertion of the prefoamed mass into the mould cavity, the pressure of the prefoamed mass is controlled by means of the pressure regulator 20 to decrease the pressure to approximately $3 \times 10^5$ N/m² (3 bar). Inside the mould cavity the pressure is even lower, for instance approximately atmospheric pressure. Since the pressurized prefoamed mass will be subjected to a lower pressure, the gas bubbles inside the prefoamed mass will expand immediately such that the prefoamed mass inside the cavity expands instantly as well and will fill the mould cavity.

Before supplying the prefoamed mass to the mould cavity of the respective mould 4, the mould 4 is heated by means of the heating means 22 provided in the mould, preferably adjacent the mould cavity surface. Preferably, the mould is heated to approximately the baking temperature, which temperature is preferably approximately 180-225° C. Due to the fact that the prefoamed mass when inserted into the mould cavity comprises a cell structure with relatively thin cell walls, these walls may burst due to the low internal pressure inside the mould cavity such that vaporization of the prefoamed mass can be obtained effectively. Subsequently, the internal pressure inside the mould cavity will increase due to the fact that the heated mould transforms the blowing agent, such as water, inside the prefoamed mass into vapour. Consequently, the prefoamed mass will expand a little further after insertion in the mould cavity, thereby completely filling said cavity. Because of the open cell structure, the water vapour can leave the mould cavity easily. During the inserting of the prefoamed mass into the mould cavity, expansion or compression of the prefoamed mass inside the mould cavity can be controlled by means of controlling the pressure.

During supplying the prefoamed mass into the mould cavity, the mould cavity is preferably almost entirely filled. Consequently, the skin formation of the product to be manufactured will occur such that the marbling and shining will be prevented or at least minimized, and internally the foam formation will show a homogeneous density and evenly distributed structure This is obtained by the fact that relatively quick filling of the mould cavity prevents different mass flow patterns inside the mould cavity. Consequently, a relative smooth and even outer surface of the product is obtained. Furthermore, because of the relatively quick filling of the mould cavity, the process cycle may be relatively short. For instance compared to the method according to WO 96/30186, the process cycle time may be reduced with approximately 25-30% or even with 50% resulting in decreased manufacturing costs.

Besides, by filling the mould cavity almost entirely, vaporization of the formed vapour, opening of the cells and baking of the product is also obtained relatively quickly. The heated mould enables efficient stabilization of the natural polymers resulting in a final moulded product with a blown, foam structure being dimensionally stable. The final moulded product may have a density of approximately 200 grams/liter.

By way of illustration, an example is given of a method according to the invention, which should not be construed as being limitative in any way.

EXAMPLE 1

The suspension vessel 8 contained a mixture of approximately:
- 70 liters water
- 0.5 kg silicon HY oil
- 50 kg potato starch food grade
- 0.1 kg hydroxylapatiet
- 3.75 kg chnina clay spec
- 3.75 kg hydrocarb 95 T
- 0.1 kg Keltrol F
- 0.4 kg Guar
- 6 kg Cellulose white (ca. 2.5 mm)

Total: approximately 135.2 kg of batter. These components are mixed in a Hobart mixer.

The foaming agent vessel 10 contained approximately 1.5 kg of marlinat 242-28. As well the batter from the suspension vessel 8 as well as the foaming agent from the foaming agent vessel is supplied to the prefoaming means 12, for instance by suitable pumping means. The prefoaming means 12 comprises a Mondo mixer in which the batter and the foaming agent were mixed and air was introduced to create the prefoamed mass. The density of the batter was approximately 1050 kg/m3. The batter pumping means supplied the batter with 60 liter/hour to the Mondo mixer. The foaming agent was supplied to the Mondo mixer with approximately 0.7 liter/hour. The air was introduced with approximately 135 liter/hour. The prefoamed mass was stirred with a speed of approximately 350 rpm. During prefoaming of the prefoamed mass, the pressure regulator kept the batter under a pressure of approximately $5 \times 10^5$ N/m$^2$ (5 bar) resulting in a prefoamed mass having a density of approximately 320 kg/m3, measured at atmospheric pressure. The pressure regulator is configured for controlling the flow rate of the batter, the foaming agent and the air. The pressure in the conduit between the prefoaming means and the injection moulding station was kept substantially constant at approximately $5 \times 10^5$ N/m$^2$ (5 bar) resulting in a prefoamed mass having a density of approximately 720 kg/m3. The pressure inside the prefoamed mass supplies was kept substantially constant at approximately $3 \times 10^5$ N/m$^2$ (3 bar) to obtain a substantially constant dosing inside the mould cavities. The moulding cycle was approximately 70 seconds in which in each mould six products were moulded, wherein the apparatus comprised six injection moulding station, thus resulting in 36 products in one process cycle. Each product has a weight of approximately 13.5 grams.

Figure 2:
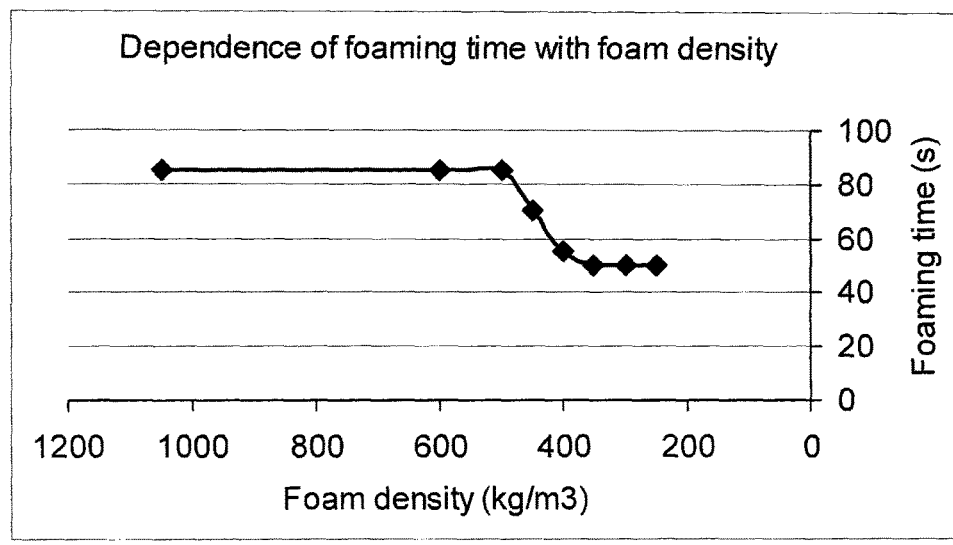
FIG. 2 shows a diagram indicating a dependence of the foaming time relative to the foam density.

In FIG. 2, the dependence of the foaming time with the foam density of a similar batter as indicated with Example 1 is diagrammatically shown. As can be derived from said diagram, the foaming time of a product manufactured from said batter relates to a foam density as follows:

| Foam density at atmospheric pressure (kg/m3) | Foaming time (s) |
| --- | --- |
| 1050 | 85 |
| 600 | 85 |
| 500 | 85 |
| 450 | 70 |
| 400 | 55 |
| 350 | 50 |
| 300 | 50 |
| 250 | 50 |

The relation of the foaming time and the foam density as indicated in the above table is determined by means of mixing a batter with a similar composition as indicated with Example 1. However, different foams were with different densities were created by varying the air flow to the Mondo mixer. The obtained foams were supplied to a respective vessel in which the internal pressure was kept substantially constant at $3 \times 10^5$ N/m$^2$ (3 bar). After the respective vessels were filled, said vessels were connected to the injection system of the injection moulding station of the apparatus. For each respective foam with the respective density, the foaming time (i.e. cycle time, opening and closing) was determined. In different words, it was determined at which foaming time the product had been stabilized sufficiently. With a density of less than 500 grams/liter a decrease in cycle time was discovered. This decrease in cycle time stabilized at a density of approximately 350 grams/liter. Products manufactured from a foam with a density below 450 grams/liter had a more homogeneous foam structure and shown signs of marbling and/or shininess.

Although illustrative embodiments of the present invention have been described above, in part with reference to the accompanying drawings, it is to be understood that the invention is not limited to these embodiments. Variations to the disclosed embodiments can be understood and effected by those skilled in the art in practicing the claimed invention, from a study of the drawings, the disclosure, and the appended claims. It will be clear, for example, that the products that are manufactured by means of the method according to the invention can be of different shapes and dimensions. For instances packages for food products, packages for other kinds of products and the like products. Furthermore, the batter may comprise additional ingredients next to the natural polymers, water and fibres. The prefoaming means may comprise different kind of mixers, for instance a Mondo mixer, a Hansa mixer, a Shuffle mixer or the like mixers. Forming of the batter may be obtained by means of a Hobart mixer.

Reference throughout this specification to "one embodiment" or "an embodiment" means that a particular feature, structure or characteristic described in connection with the embodiment is included in at least one embodiment in the present invention. Thus, the appearances of the phrases "in one embodiment" or "in an embodiment" in various places throughout this specification are not necessarily all referring to the same embodiment. Furthermore, it is noted that particular features, structures or characteristics of one or more embodiments may be combines in any suitable manner to form new, not explicitly described embodiments.

The invention claimed is:

1. A method for manufacturing a sustainable product with a blown, foam structure, the method comprising:
    prefoaming a liquid batter comprising water and at least one natural polymer to form a pressurized, prefoamed liquid batter, wherein said prefoaming is conducted by introducing an amount of pressurized gas into the liquid batter while pressure is applied to the liquid batter to form gas bubbles in said pressurized liquid batter;
    conveying the pressurized, prefoamed liquid batter toward a cavity of a mold;
    passing the pressurized prefoamed liquid batter into the cavity of the mold, wherein the pressurized, prefoamed liquid batter is depressurized upon said passing; and
    heating the prefoamed liquid batter in the mold to stabilize the prefoamed liquid batter and form the blown, foam structure,
    wherein the pressurized, prefoamed liquid batter remains pressurized between said prefoaming and conveying steps and until said passing into the cavity of the mold.

2. The method according to claim 1, wherein a pressure inside the mold cavity is lower than the pressure of the pressurized, prefoamed liquid batter before said passing into the mold cavity.

3. The method according to claim. 1, wherein after said prefoaming, the pressurized, prefoamed liquid batter has a lower density than the liquid batter.

4. The method according to claim 1, wherein the liquid batter is in the form of a suspension or solution of the water and the at least one natural polymer.

5. The method according to claim 1, wherein a ratio of the volume of the pressurized liquid batter with respect to the volume of the prefoamed liquid batter is approximately between 1:1.6 and 1:1.2.

6. The method according to claim 1, wherein the pressure of the liquid batter during said prefoaming is approximately between $3\times10^5$ N/m$^2$ (3 bar) and $6\times10^5$ N/m$^2$ (6 bar).

7. The method according to claim 1, wherein the density of the prefoamed liquid batter is approximately 200-400 grams/liter, measured at atmospheric pressure ($1.01\times105$ N/m2 (1.01 bar)).

8. The method according to claim 1, wherein the pressure of the pressurized, prefoamed liquid batter between said prefoaming and conveying steps and until said passing into the cavity of the mold is approximately $5\times10^5$ N/m$^2$ (5 bar).

9. The method according to claim 8, wherein the prefoamed liquid batter has a density of approximately 700-800 grams/liter at said pressure of approximately $5\times10^5$ N/m$^2$ (5 bar).

10. The method according to claim 1, wherein the pressure of the pressurized, prefoamed liquid batter during said conveying, is approximately between $2\times10^5$ N/m$^2$ (2 bar) and $4\times10^5$ N/m$^2$ (4 bar).

11. The method according to claim 1, wherein the mold is an injection mold.

12. The method according to claim 1, wherein the mold is heated to a baking temperature prior to said passing of the pressurized, prefoamed liquid batter into the mold, and wherein the baking temperature is approximately 180° C.-240° C.

13. The method according to claim 1, wherein the liquid batter comprises a blowing agent and at least 10% of weight of said water.

14. The method according to claim 1, wherein the method further comprises inserting one or more additives to the liquid batter during or after said prefoaming.

15. The method according to claim 14, wherein the one or more additives comprises at least one of a cross linker, stabilizer, foaming agent, and colouring agent.

16. The method according to claim 1, wherein the at least one natural polymer comprises starch.

17. The method according to claim 1, wherein the introduced gas is oxygen, nitrogen, or carbon dioxide.

18. The method according to claim 1, wherein the pressure of the liquid batter during said prefoaming is approximately $5\times10^5$ N/m$^2$ (5 bar).

19. The method according to claim 1, wherein the pressure of the pressurized, prefoamed liquid batter during said passing is approximately $3\times10^5$ N/m$^2$ (3 bar).

20. The method according to claim 1, wherein the mold is heated to a baking temperature prior to said passing of the pressurized, prefoamed liquid batter into the mold, wherein the baking temperature is approximately 180° C.-225° C.

21. The method according to claim 1, wherein said passing results in the gas bubbles expanding in the cavity of the mold before said heating, thereby forming a foamed mass from the prefoamed liquid hatter to which said heating is subjected.

22. The method according to claim 1, wherein said prefoaming is conducted by a mixer of a prefoaming means.

* * * * *